United States Patent

[11] 3,603,654

| | | | |
|---|---|---|---|
| [72] | Inventor | Melvyn R. Bird | |
| | | Huron, Ohio | |
| [21] | Appl. No. | 21,655 | |
| [22] | Filed | Mar. 23, 1970 | |
| [45] | Patented | Sept. 7, 1971 | |
| [73] | Assignee | General Motors Corporation | |
| | | Detroit, Mich. | |

[54] BALL BEARING SELF-ALIGNING SEAT
2 Claims, 3 Drawing Figs.

[52] U.S. Cl. .................................................. 308/35
[51] Int. Cl. .................................................. F16c 21/00
[50] Field of Search............................................ 308/35, 9, 122

[56] References Cited
UNITED STATES PATENTS
2,278,663   4/1942   Loeffler et al. ............... 308/35

Primary Examiner—Martin P. Schwadron
Assistant Examiner—Frank Susko
Attorneys—Jean L. Carpenter and F. J. Fodale ABSTRACT: An externally pressurized gas bearing of the porous sleeve type is used to rotatably support one end of a rotor on an electric motor. The gas bearing housing in turn is mounted on a ball bearing having limited radial play and ball raceways of open curvature thus giving a limited self-alignment to the gas bearing. The ball bearing is normally inoperative due to an interposed frangible link, however, should the gas supply be interrupted during the operation of the motor, seizure of the rotor is prevented by a breaking of the link and rotation of the ball bearing.

INVENTOR.
Melvyn R. Bird
BY
F. J. Fodale
ATTORNEY

BALL BEARING SELF-ALIGNING SEAT

My invention relates generally to externally pressurized gas bearings and more specifically to such bearings for use in machinery wherein interruption of the pressure gas supply causes an inordinate amount of damage to the machinery.

Such a situation occurs, for instance, in large electric motors where bearing failure, should it cause seizure of the rotor, would result in burning out the motor windings. Accordingly, the object of my invention is to provide an externally pressurized gas bearing for use in such an environment wherein means are provided to prevent seizure of the rotating element in the event of interruption of the gas supply.

Another object of my invention is to provide such a bearing which is capable of self-alignment with the rotatable member within limits.

Both of these objects I have accomplished with the simple expedient of an interposed ball bearing having limited radial play and raceways of open curvature with the ball bearing being normally constrained against rotation by a frangible link. Other objects and advantages of the invention will hereinafter become more fully apparent from the following description of the annexed drawings, which illustrate a preferred embodiment, and wherein.

Figure 1:
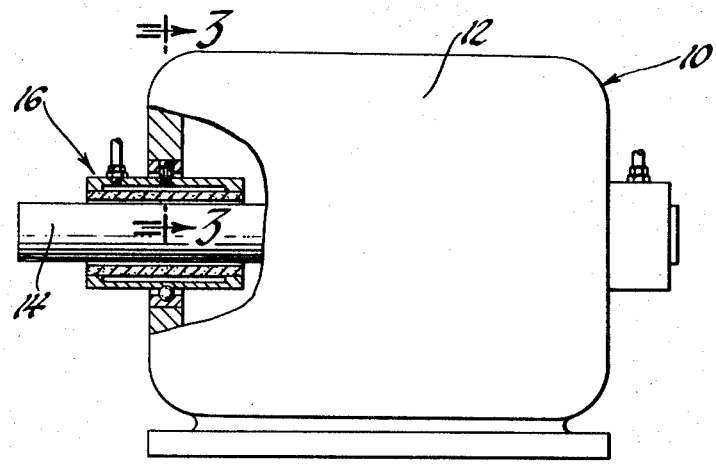
FIG. 1 is an elevation view of an electric motor partially broken away to show a bearing mounting means in accordance with my invention.

Referring now to FIG. 1, an electric motor is indicated generally at 10. The motor includes a casing 12 and a rotor 14. The rotor 14 is rotatably supported by a bearing mounting means in accordance with my invention and is indicated generally at 16 in FIG. 1 and shown in detail in FIG. 2.

Figure 2:
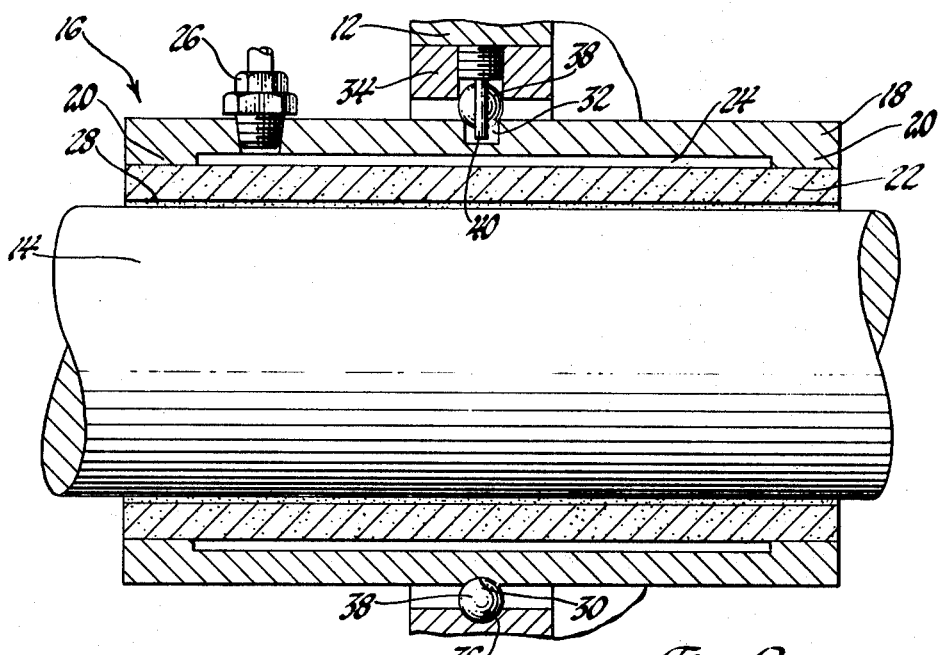
FIG. 2 is an enlargement of the bearing mounting means shown in FIG. 1.
Figure 3:
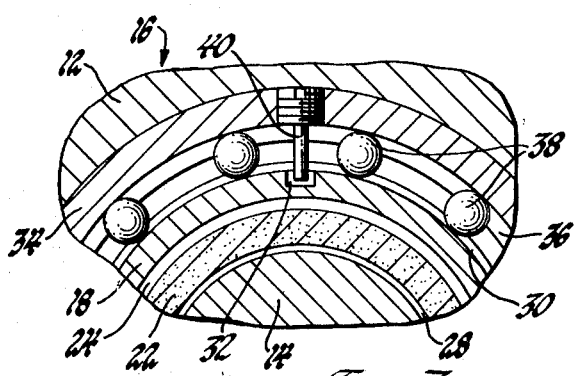
FIG. 3 is a section taken along the line 3—3 of FIG. 1 and looking in the direction of the arrows.

In reference to FIG. 2, the bearing mounting means 16 includes an externally pressurized gas bearing which includes a housing 18 having end flanges 20 on which is nonrotatably secured a permeable sleeve 22 forming a plenum 24 therebetween. A fluid connector 26 connects the plenum to a source of pressurized gas (not shown). The inner circumference of the permeable sleeve 22 has a diameter a few thousandths greater than the outer diameter of the portion of the rotor 14 which it embraces providing a gas bearing space 28 therebetween. The operation of an externally pressurized gas bearing and the manner in which a load-carrying gas film is developed in the space 28 to rotatably support the rotor 14 is well known. Suffice it to say that the required clearance for the space 28 can be determined from the pressure of the gas source, the length and permeability of the sleeve 22 and the load which the rotor impasses. Generally the clearance is on the order of 0.001 inch per inch of diameter of the member 14 and nonlimiting examples of suitable material for the sleeve 22 are porous bronzes, graphites and ceramics.

The housing 18 includes a raceway 30 in its outer surface and further includes a hole 32 opening into this raceway. An outer race 34 is pressfitted into a bore in the casing 12 and provides a raceway 36 confronting the raceway 30. A complement of balls 38 is disposed in the raceways, however, the housing 18 is normally nonrotative due to the frangible pin 40 which extends radially inwardly from the outer race 34 and protrudes into the hole 32.

By designing the raceways to have an open curvature, that is, a radius of curvature appreciably greater than that of the balls and by further including radial play between the raceways, the ball bearing has a limited self-alignability as is well known in the ball bearing art. It is also appreciated that due to the small clearance involved with the space 28, axial alignment of the permeable sleeve on the rotor 14 is important. This alignment is somewhat self-generating due to the operating characteristics of externally pressurized gas bearings provided that the housing itself is capable of self-alignment. In the combination which is disclosed, such self-alignment is possible because of the radial play and open curvature raceway of the bearing.

The operation of my device is as follows. Under normal conditions with the motor running, pressurized gas is supplied to the plenum 24 from whence it permeates through the porous sleeve 22 and into the clearance space 28. In the clearance space 28, the gas develops a load-carrying film as it flows out the open ends of the space. The load-carrying film aligns the porous sleeve 22 on the rotor 14 and rotatably supports the rotor 14.

Should the source of pressurized gas be interrupted for any reason during motor operation, the rotor contacts and rubs on the porous sleeve. Should the porous sleeve 22 attempt to seize the rotor 14, the housing 18 will be rotated slightly breaking the frangible link 40 thereby allowing the housing 18 to rotate with the rotor 14 and with respect to the outer race 34 through the balls 38. Thus failure of the motor will be circumvented.

I wish it to be understood that I do not desire to be limited to the exact details of construction shown and described, for obvious modifications will occur to a person skilled in the art.

I claim:

1. In a device having a casing and rotor wherein seizure of the rotor during operation of the device causes substantial damage to the device, a bearing mount for the rotor comprising in combination, a bearing member including a bearing sleeve having a circumferential surface spaced closely adjacent a generally cylindrical portion of said rotor, means to deliver has under pressure through said bearing sleeve to the space between said member and said rotor portion, said space being of sufficient thickness to permit said gas to develop a load-carrying gas film to rotatably support said rotor, ball bearing means disposed between said bearing member and said casing, said ball bearing means having limited radial play and open ball race curvatures whereby said bearing member is limitedly universally mounted on said casing for self-alignment with said rotor, and frangible link means interconnecting said casing and said cylindrical bearing member whereby seizure of the said rotor portion on said bearing sleeve breaks said frangible link means to permit rotation of said rotor through said ball bearing means.

2. The combination comprising, a race having a first raceway, a generally annular housing concentric with said race, a second raceway on said housing and confronting said first raceway, a complement of antifriction element in said raceways, a frangible pin extending generally radially from one of said raceways and protruding in a hole in the other of said raceways whereby said race and annular housing are normally substantially nonrotatable with respect to each other, a permeable sleeve mounted on said housing on the side opposite said second raceway means, a plenum between said housing and said permeable sleeve, and fluid connector means leading to said plenum.